US 8,727,453 B2

(12) United States Patent
Saita et al.

(10) Patent No.: US 8,727,453 B2
(45) Date of Patent: May 20, 2014

(54) HYDRAULIC PRESSURE CONTROL APPARATUS

(75) Inventors: Norihiro Saita, Atsugi (JP); Taichi Shibata, Atsugi (JP); Masamichi Imamura, Atsugi (JP); Shinichiro Nishida, Zama (JP); Satoshi Doi, Atsugi (JP); Tadaharu Yokota, Atsugi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 319 days.

(21) Appl. No.: 13/044,853

(22) Filed: Mar. 10, 2011

(65) Prior Publication Data

US 2011/0221264 A1    Sep. 15, 2011

(30) Foreign Application Priority Data

Mar. 11, 2010    (JP) ................................. 2010-054424

(51) Int. Cl.
*B60T 11/34* (2006.01)
*F16K 31/02* (2006.01)
*B60T 15/36* (2006.01)

(52) U.S. Cl.
USPC ..... 303/20; 303/119.1; 303/121; 303/122.04; 303/139; 303/151; 303/155; 303/191; 303/199

(58) Field of Classification Search
USPC ............ 303/20, 122, 122.04, 122.05, 122.08, 303/155, 113.1, 113.5; 701/70, 71
See application file for complete search history.

(56) References Cited

U.S. PATENT DOCUMENTS

| 2004/0035469 | A1* | 2/2004 | Suzuki | 137/552 |
| 2006/0113836 | A1* | 6/2006 | Nakamura | 303/122.04 |
| 2006/0158032 | A1* | 7/2006 | Miyazaki et al. | 303/155 |
| 2007/0228821 | A1* | 10/2007 | Maki et al. | 303/151 |
| 2007/0228823 | A1* | 10/2007 | Kokubo et al. | 303/155 |
| 2009/0096284 | A1* | 4/2009 | Nakaoka et al. | 303/139 |

FOREIGN PATENT DOCUMENTS

JP    2005-35470    2/2005

* cited by examiner

*Primary Examiner* — Robert A Siconolfi
*Assistant Examiner* — San Aung
(74) *Attorney, Agent, or Firm* — Antonelli, Terry, Stout & Kraus, LLP.

(57) ABSTRACT

A hydraulic pressure control apparatus has an electromagnetic valve having a valve body forced to one side by an elastic member and a coil driving the valve body to the other side; a hydraulic pressure control section for calculating a command current value to drive the electromagnetic valve and controlling a hydraulic pressure in a hydraulic circuit by opening/closing the electromagnetic valve; a current detection section detecting a value of the current passing through the coil; and a command current value correction section. The command current value correction section detects a change of an inductance of the coil when the valve body moves from the one side to the other side or from the other side to the one side through the current detection section, and corrects the command current value using the detected inductance change.

20 Claims, 11 Drawing Sheets

HYDRAULIC PRESSURE CONTROL APPARATUS

BACKGROUND OF THE INVENTION

The present invention relates to a hydraulic pressure control apparatus.

A related art hydraulic pressure control apparatus has been disclosed in, for example, Japanese Patent Provisional Publication No. 2005-35470 (hereinafter is referred to as "JP2005-35470").

In JP2005-35470, in order to reduce variation of controlled hydraulic pressure with current that is supplied to an electromagnetic valve, a gradient of change of the hydraulic pressure when the electromagnetic valve opens is detected using a pressure sensor, and the hydraulic pressure control apparatus corrects a command current value so that the detected gradient of the hydraulic pressure change becomes the same as a certain reference change gradient.

SUMMARY OF THE INVENTION

In this related art hydraulic pressure control apparatus, however, since the pressure sensor is essential for configuration of the hydraulic pressure control apparatus, this leads to an increase in cost.

It is therefore an object of the present invention to provide a hydraulic pressure control apparatus which is capable of reducing the variation of controlled hydraulic pressure with the current of the electromagnetic valve without using the pressure sensor.

According to one aspect of the present invention, a hydraulic pressure control apparatus comprises: an electromagnetic valve which has (a) a valve body forced to one side by an elastic member and (b) a coil driving the valve body to the other side and is driven on the basis of a command current value; a hydraulic pressure control section which calculates the command current value to drive the electromagnetic valve and controls a hydraulic pressure in a hydraulic circuit by opening/closing the electromagnetic valve; a current detection section which detects a value of the current passing through the coil; and a command current value correction section which detects a change of an inductance of the coil when the valve body moves from the one side to the other side or from the other side to the one side through the current detection section, and corrects the command current value using the detected inductance change.

According to another aspect of the present invention, a hydraulic pressure control apparatus comprises: an electromagnetic valve which has (a) a valve body forced to one side by an elastic member and (b) a coil driving the valve body to the other side and is driven on the basis of a command current value; a hydraulic pressure control section which calculates the command current value to drive the electromagnetic valve and controls a hydraulic pressure in a hydraulic circuit by opening/closing the electromagnetic valve; a current detection section which detects a value of the current passing through the coil; and a command current value correction section which checks the current value when the valve body moves from a valve closed position to a valve open position, and corrects the command current value on the basis of a current value supplied to the coil from a power supply when a difference between the current value and a predetermined threshold value becomes a maximum.

According to a further aspect of the invention, a hydraulic pressure control apparatus used for a hydraulic unit in a brake unit installed in a vehicle, comprises: a dual line piping system; oil passages which are formed in each line pipe and connect a master cylinder and a wheel cylinder; an electromagnetic valve which is arranged in the oil passage and has (a) a valve body forced to one side by an elastic member and (b) a coil driving the valve body to the other side and is driven on the basis of a command current value; a hydraulic pressure control section which calculates the command current value to drive the electromagnetic valve and controls a hydraulic pressure in the oil passage by opening/closing the electromagnetic valve; a current detection section which detects a value of the current passing through the coil; and a command current value correction section which, in a state in which no hydraulic pressure is generated in the oil passage, detects a change of an inductance of the coil when the valve body moves from the one side to the other side or from the other side to the one side by detecting a rate of change of the current value of the coil or detecting an inflection point of the current change through the current detection section, and corrects the command current value using the detected inductance change, and the electromagnetic valve is driven on the basis of the corrected command current value.

According to the present invention, the variation of controlled hydraulic pressure with the current of the electromagnetic valve can be reduced without using the pressure sensor.

The other objects and features of this invention will become understood from the following description with reference to the accompanying drawings.

BRIEF DESCRIPTION OF THE DRAWINGS

FIG. 8A is a case where a valve current target value base value is not corrected. FIG. 8B is a case where the control of the embodiment 1 is applied.

DETAILED DESCRIPTION OF THE INVENTION

Embodiments of a hydraulic pressure control apparatus of the present invention will be explained below with reference to the drawings.

Figure 1:
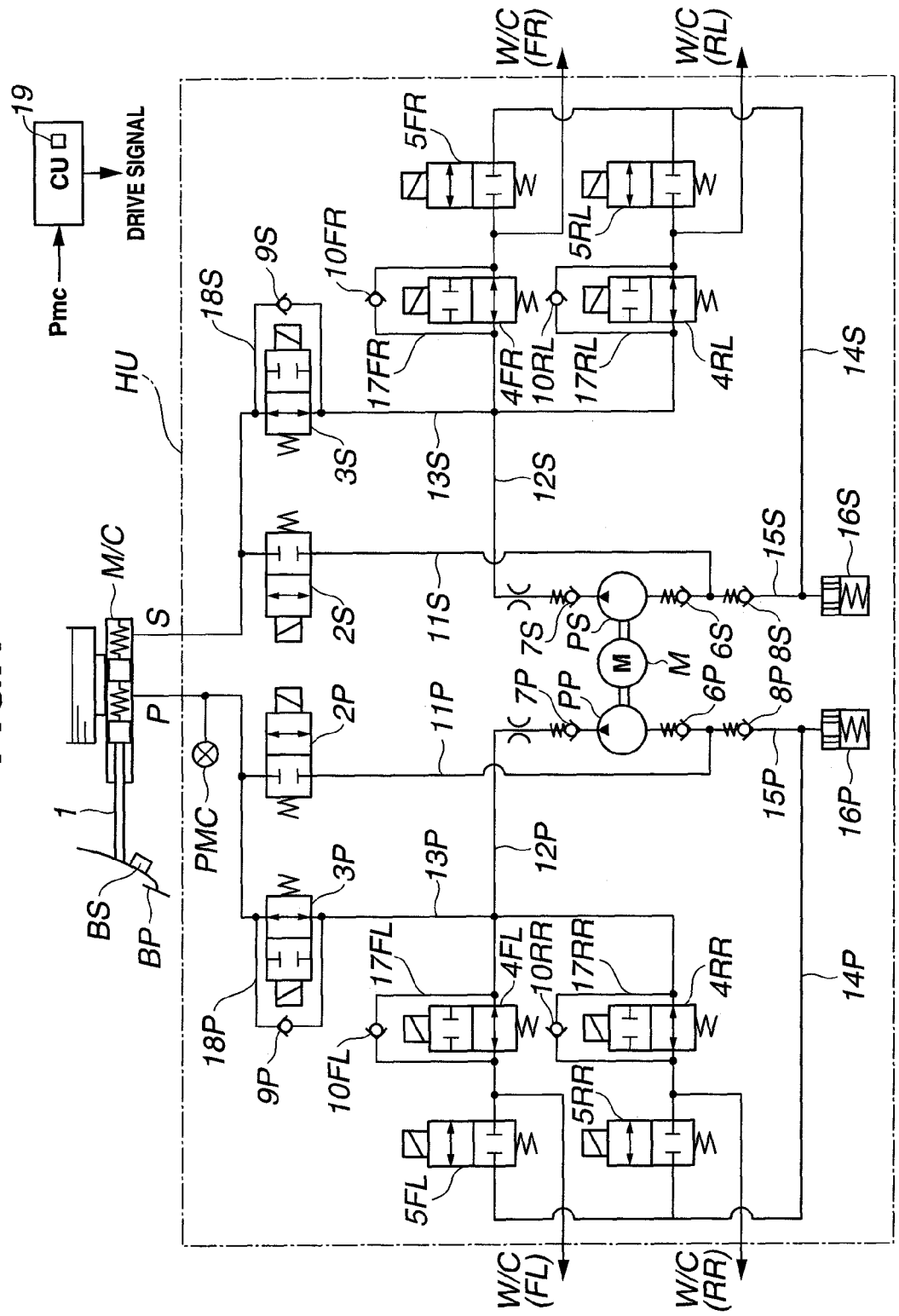
FIG. 1 is a hydraulic circuit of a hydraulic pressure control apparatus of an embodiment 1.

[Embodiment 1]
First, a configuration will be explained.
[Configuration of Brake Unit]
FIG. 1 is a hydraulic circuit of a hydraulic pressure control apparatus of an embodiment 1. The hydraulic pressure control apparatus of the embodiment 1 has a motor, pumps, electromagnetic valves and sensors and others. This hydraulic pressure control apparatus is a vehicle brake boost apparatus in which electrical and mechanical elements (or components) are combined, and has a hydraulic unit HU installed between a master cylinder M/C and a wheel cylinder W/C and has a control unit (a hydraulic pressure controller or a hydraulic pressure control section or means) CU connected to this hydraulic unit HU and controlling each element or component. However, this configuration or structure is not limited to this combination. The hydraulic unit HU and the control unit CU could be separated from each other.

In the hydraulic circuit of the embodiment 1, a so-called X-piping arrangement (x-pipe system) or diagonal piping arrangement (diagonal system), which has two or dual line piping system of P line pipe and S line pipe, is used.

The P line pipe is connected to a wheel cylinder W/C (FL) of a left front (FL) wheel and a wheel cylinder W/C (RR) of a right rear (RR) wheel. The S line pipe is connected to a wheel cylinder W/C (FR) of a right front (FR) wheel and a wheel cylinder W/C (RL) of a left rear (RL) wheel. As shown in FIG. 1, a pump PP is provided in the P line pipe, and a pump PS is provided in the S line pipe. These pumps PP and PS are driven by one electric motor (hereinafter, simply described as motor) M. In the embodiment 1, a DC brush motor is used as the motor M.

A brake pedal BP is connected to the master cylinder M/C via an input rod 1. The brake pedal BP is provided with a brake switch BS that detects an operation state of the brake pedal BP. Here, a booster that boosts an input of the input rod 1 could be provided in the configuration.

The master cylinder M/C and each suction side of the pumps PP and PS (hereinafter, simply described as the pump P) are connected by pipes 11P and 11S (hereinafter, simply described as the pipe 11). On the each pipe 11, gate-in valves 2P and 2S of a normally-closed ON/OFF electromagnetic valve are provided. Between the master cylinder M/C and the gate-in valve 2P, a pressure sensor PMC that detects a hydraulic pressure of the master cylinder M/C is installed.

Further, between the gate-in valves 2P and 2S (hereinafter, simply described as the gate-in valve 2) and the pump P in the pipe 11, check valves 6P and 6S (hereinafter, simply described as the check valve 6) are provided. This check valve 6 allows a flow of brake fluid in a direction from the gate-in valve 2 toward the pump P, and forbids a brake fluid flow of the opposite direction.

On the other hand, a discharge or delivery side of the each pump P and the each wheel cylinder W/C are connected by pipes 12P and 12S (hereinafter, simply described as the pipe 12). On the each pipe 12, solenoid-in valves 4FL, 4RR, 4FR and 4RL (hereinafter, simply described as the solenoid-in valve 4) of a normally-open proportional electromagnetic valve are provided. These solenoid-in valves 4FL, 4RR, 4FR and 4RL belong to the respective wheel cylinders of W/C (FL), W/C (RR), W/C (FR) and W/C (RL), as illustrated in FIG. 1.

Further, between the each solenoid-in valve 4 and the pump P in the pipe 12, check valves 7P and 7S (hereinafter, simply described as the check valve 7) are provided. This check valve 7 allows a flow of the brake fluid in a direction from the pump P toward the solenoid-in valve 4, and forbids a brake fluid flow of the opposite direction.

Furthermore, pipes 17FL, 17RR, 17FR and 17RL (hereinafter, simply described as the pipe 17) are provided on the each pipe 12. As shown in FIG. 1, the pipe 17 bypasses the respective solenoid-in valves 4. On the each pipe 17, check valves 10FL, 10RR, 10FR and 10RL (hereinafter, simply described as the check valve 10) are provided. This check valve 10 allows a flow of the brake fluid in a direction from the wheel cylinder W/C toward the pump P, and forbids a brake fluid flow of the opposite direction.

The master cylinder M/C and the each pipe 12 are connected by pipes 13P and 13S (hereinafter, simply described as the pipe 13). The pipe 12 and the pipe 13 meet between the pump P and the solenoid-in valve 4. On the each pipe 13, gate-out valves 3P and 3S (hereinafter, simply described as the gate-out valve 3) of a normally-open proportional electromagnetic valve are provided.

As can be seen in FIG. 1, pipes 18P and 18S (hereinafter, simply described as the pipe 18) are provided on the respective pipes 13. This pipe 18 bypasses the gate-out valve 3. On the each pipe 18, check valves 9P and 9S (hereinafter, simply described as the check valve 9) are provided. This check valve 9 allows a flow of the brake fluid in a direction from the master cylinder M/C toward the wheel cylinder W/C, and forbids a brake fluid flow of the opposite direction.

In the hydraulic circuit, reservoir 16P and 16S (hereinafter, simply described as the reservoir 16) are also installed at the suction side of the pump P. The each reservoir 16 and the each pump P are connected by pipes 15P and 15S (hereinafter, simply described as the pipe 15) respectively. Between the reservoir 16 and the pump P, check valves 8P and 8S (hereinafter, simply described as the check valve 8) are provided. This check valve 8 allows a flow of the brake fluid in a direction from the reservoir 16 toward the pump P, and forbids a brake fluid flow of the opposite direction.

The wheel cylinder W/C and the pipe 15 are connected by pipes 14P and 14S (hereinafter, simply described as the pipe 14). The pipe 14 and the pipe 15 meet between the check valve 8 and the reservoir 16. On the each pipe 14, solenoid-out valves 5FL, 5RR, 5FR and 5RL (hereinafter, simply described as the solenoid-out valve 5) of a normally-closed ON/OFF electromagnetic valve are provided.

The control unit CU calculates a control target value for automatic brake control such as anti-skid brake control (ABS), adaptive cruise control (ACC) and vehicle dynamics control (VDC) on the basis of a master cylinder pressure Pmc detected by the pressure sensor PMC and vehicle information (a wheel speed, a vehicle acceleration), and controls each drive of the gate-in valve 2, the gate-out valve 3, the solenoid-in valve 4, the solenoid-out valve 5 and the motor M.

Figure 2:
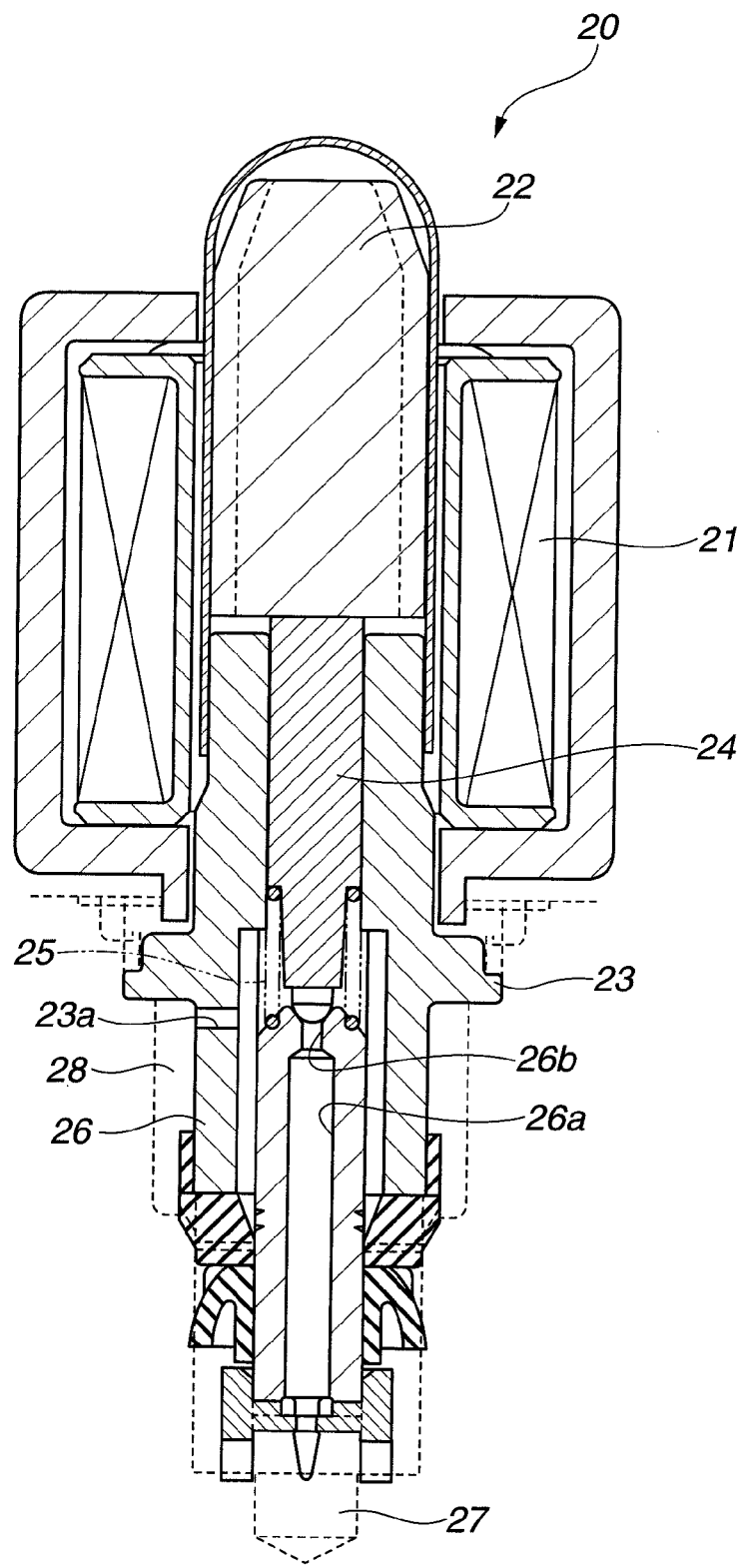
FIG. 2 is a longitudinal cross section of a proportional electromagnetic valve 20 used for a gate-out valve 3 and a solenoid-in valve 4 in FIG. 1.

[Normally-Open Proportional Electromagnetic Valve]
FIG. 2 is a longitudinal cross section of a proportional electromagnetic valve 20 used for the gate-out valve 3 and the solenoid-in valve 4 in FIG. 1.

The proportional electromagnetic valve 20 has a coil 21 that generates an electromagnetic force by being supplied with current and an armature 22 that acts by the electromagnetic force. A valve body 23 press-fitted into a housing (not shown) is provided with an axial direction penetration hole. A plunger (a valve body) 24 that moves integrally with the armature 22, a coil spring (an elastic member) 25 that forces the plunger 24 in a valve-opening direction and a seat valve 26 are provided in the axial direction penetration hole.

The seat valve 26 has an axial center oil passage 26a and an orifice 26b. The axial center oil passage 26a connects to an oil passage 27 in the axial center of the seat valve 26.

The orifice 26*b* is provided at an upper end of the seat valve 26 and communicates with a seat surface. A radial direction oil passage 23*a* that communicates with an oil passage 28 is formed at a side surface of the valve body 23.

When starting the current supply to the coil 21, the electromagnetic force is generated in the coil 21, and the armature 22 is attracted or pulled downward in FIG. 2, then the plunger 24 is pulled down against a spring force (an urging force) of the coil spring 25. With this action, the plunger 24 touches or is fitted to the seat surface of the seat valve 26 and the orifice 26*b* is closed, thereby interrupting or breaking the communication between the oil passage 27 and the oil passage 28.

In a no-current supply state, the plunger 24 is forced upward in FIG. 2 by the coil spring 25, and the orifice 26*b* is released (opened) then the oil passage 27 and the oil passage 28 communicate with each other.

[Electromagnetic Valve Drive Circuit]

Figure 3:
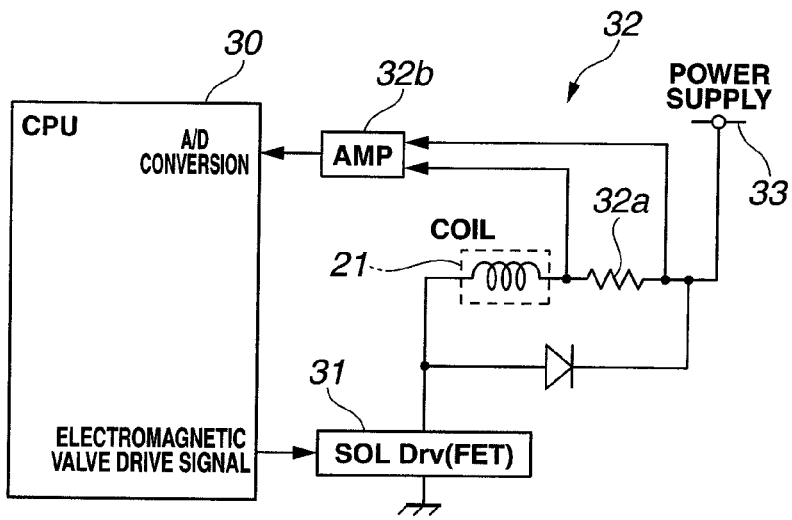
FIG. 3 is a drive circuit to drive the gate-out valve 3 and the solenoid-in valve 4 in a control unit CU of the embodiment 1.

FIG. 3 is a drive circuit to drive the gate-out valve 3 and the solenoid-in valve 4 in the control unit CU of the embodiment 1.

A CPU 30 outputs an electromagnetic valve drive signal to obtain a valve current target value according to the control target value to an FET 31. The FET 31 drives the coil 21 of each electromagnetic valve in accordance with the electromagnetic valve drive signal.

Supply current to the coil 21 is detected by a current sensor (a current detector or a current detection section or means) 32, and is inputted to the CPU 30, then its A/D conversion is performed. The current sensor 32 has a shunt resistance 32*a* and a differential amplifier 32*b*. The shunt resistance 32*a* is arranged between a power supply 33 and the coil 21. The differential amplifier 32*b* calculates a difference of voltage between both terminals of the shunt resistance 32*a* (a potential difference across the shunt resistance 32*a*), and outputs a value obtained by multiplying the difference by a predetermined current conversion gain, as a current detection value, to the CPU 30.

[Valve Current Target Value Operation Process]

The control unit CU of the embodiment 1 performs the following valve current target value operation process with the aim of reducing the variation (especially, offset variation) of controlled hydraulic pressure with the current of the proportional electromagnetic valve 20.

Figure 4:
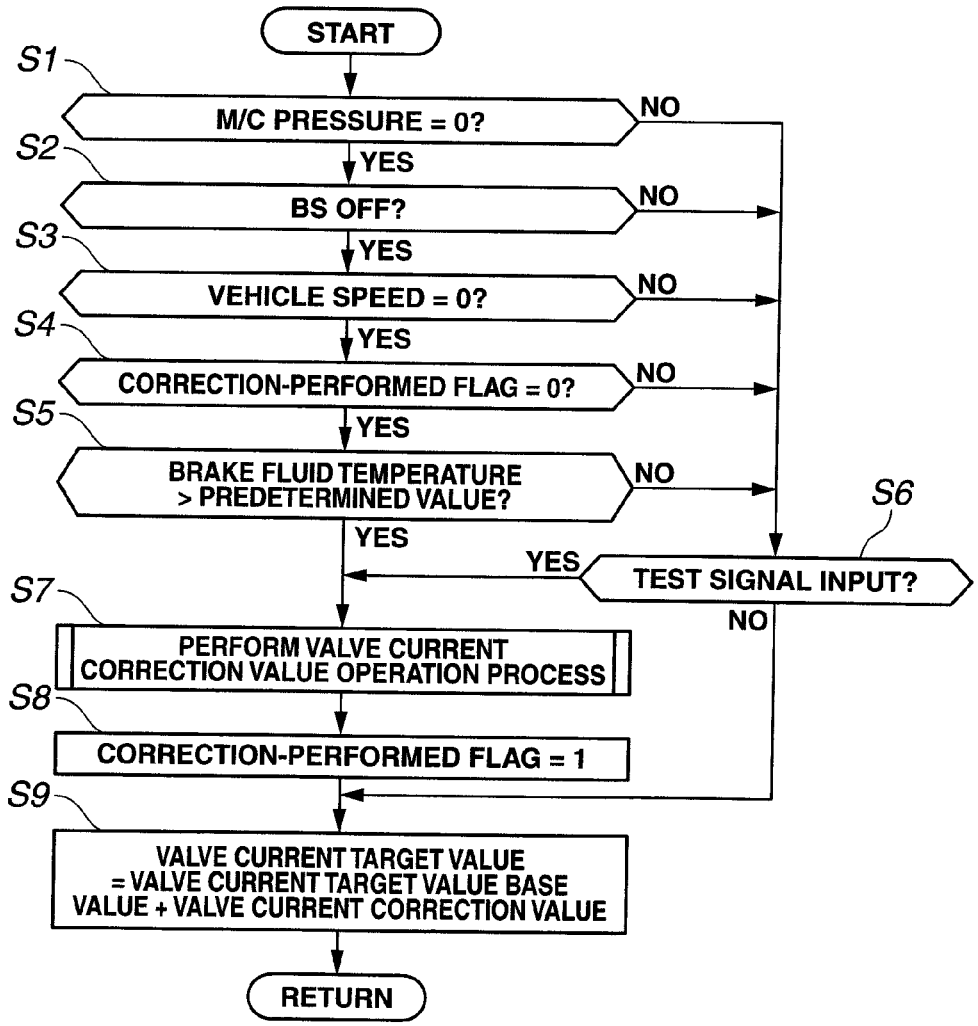
FIG. 4 is a flow chart showing a flow of a valve current target value operation process executed in the control unit CU of the embodiment 1.

FIG. 4 is a flow chart showing a flow of the valve current target value operation process executed in the control unit CU. This process is a process to calculate the valve current target value (a command current value) that determines each electromagnetic valve drive signal of the gate-out valve 3 and the solenoid-in valve 4. The process is executed at a certain operation cycle period from power-ON (ignition ON) to power-OFF (ignition OFF).

At step S1, a judgment is made as to whether or not the master cylinder pressure Pmc detected by the pressure sensor PMC is zero. If YES, the routine proceeds to step S2. If NO, the routine proceeds to step S6.

At step S2, a judgment is made as to whether or not the brake switch BS is OFF. If YES, the routine proceeds to step S3. If NO, the routine proceeds to step S6.

Here, steps S1 and S2 are the steps that check whether the brake pedal BP is depressed. Thus it is possible to execute only either one step.

At step S3, in order to check a vehicle stop state, a judgment is made as to whether or not a vehicle speed is zero. If YES, the routine proceeds to step S4. If NO, the routine proceeds to step S6.

At step S4, a judgment is made as to whether or not a correction-performed flag is cleared or reset (=0). If YES, the routine proceeds to step S5. If NO, the routine proceeds to step S6. Here, the correction-performed flag is cleared upon an initialization of the power-ON.

At step S5, a judgment is made as to whether or not a brake fluid temperature is higher than a predetermined value. If YES, the routine proceeds to step S7. If NO, the routine proceeds to step S6. Here, the predetermined value is a temperature at which brake fluid viscosity becomes high and which affects an operation error of an after-mentioned valve current correction value.

At step S6, a judgment is made as to whether or not a test signal is inputted from an external test device. If YES, the routine proceeds to step S7. If NO, the routine proceeds to step S9. Here, the input of the test signal is carried out not only at shipment of the vehicle in which the hydraulic unit HU is installed but also at shipment of the hydraulic unit HU.

At step S7, the valve current correction value operation process is performed. The valve current correction value operation process is a process in which the valve current correction value to correct a valve current target value base value is calculated. The valve current target value base value is the current target value of the proportional electromagnetic valve 20 according to the control target value the control unit CU. The valve current correction value operation process will be explained later.

At step S8, the correction-performed flag is set (=1).

At step S9, the valve current target value is calculated, and the FET 31 is PWM controlled by a Duty ratio based on the valve current target value. The valve current target value is set to a value obtained by adding the valve current correction value calculated at step S7 to the valve current target value base value. This process is executed by a valve current target value correction section (a command current value corrector or a command current value correction section or means) 19 provided in the control unit CU.

[Valve Current Correction Value Operation Process]

Figure 5:
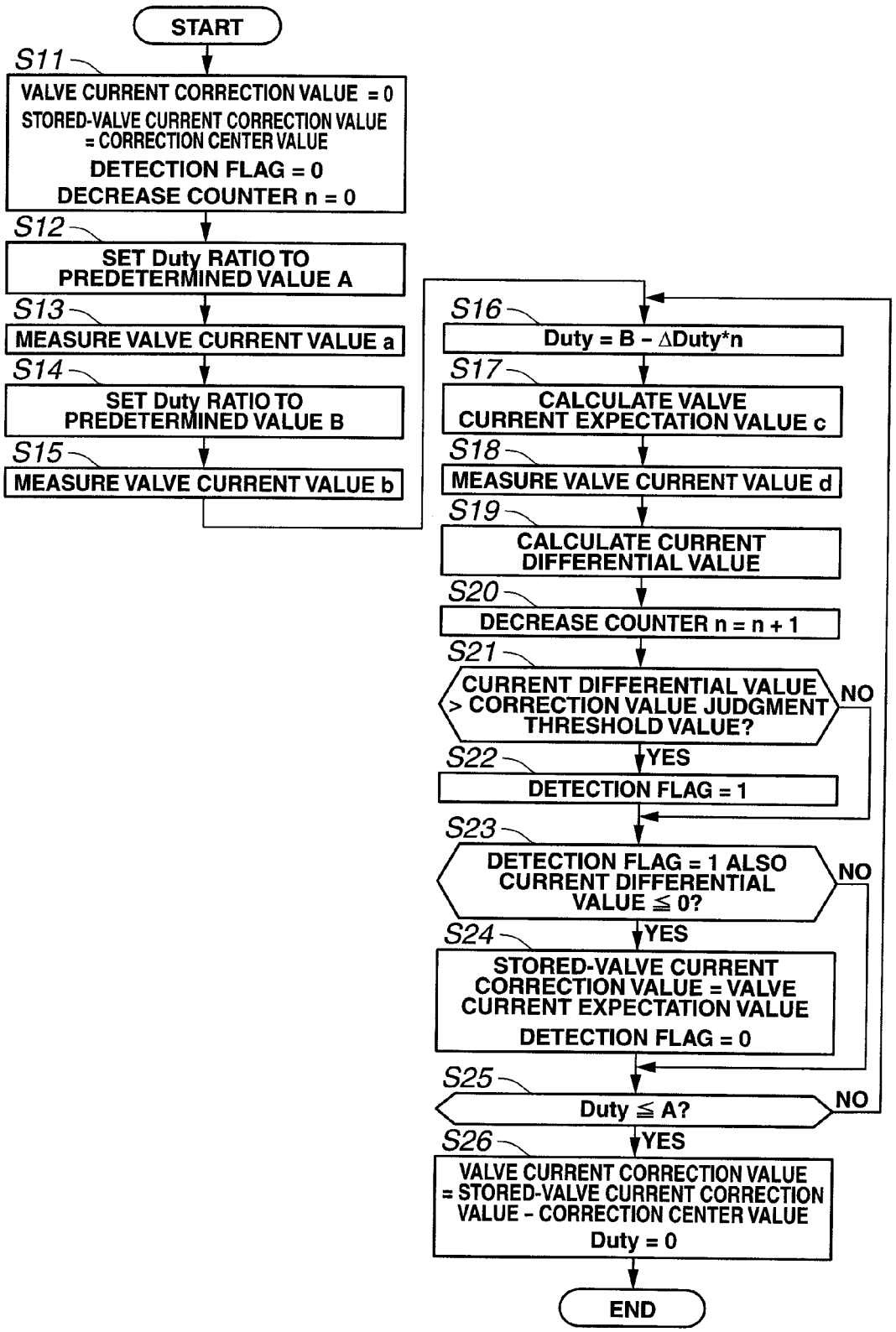
FIG. 5 is a flow chart showing a flow of a valve current correction value operation process of the embodiment 1, executed in step S7 of FIG. 4.

FIG. 5 is a flow chart showing a flow of the valve current correction value operation process of the embodiment 1, executed in step S7 of FIG. 4. This process is executed by the valve current target value correction section 19.

At step S11, the valve current correction value is set to zero, a stored-valve current correction value is set to a predetermined correction center value (a valve open design current value), a detection flag is cleared or reset (=0), and a decrease counter n is cleared or reset (=0). Here, the correction center value is an average of factory-shipped initial offset variations of the proportional electromagnetic valve 20.

At step S12, the Duty ratio is set to a lower value A. The lower value A is a Duty ratio at which the proportional electromagnetic valve 20 is brought in a fully closed state, and it is close to 0%.

At step S13, a valve current value is measured by the current sensor 32. This valve current value is set as a valve current value a.

At step S14, the Duty ratio is set to an upper value B (>A). The upper value B is a Duty ratio at which the proportional electromagnetic valve 20 is brought in a fully open state, and it is close to 100%.

At step S15, the valve current value is measured by the current sensor 32. This valve current value is set as a valve current value b.

At step S16, the Duty ratio is decreased by ΔDuty*n. Here, n is the number of decrease.

At step S17, a valve current expectation value c is calculated by the following expression.

$$c=(b-a)/(B-A)*(B-\Delta Duty*n)+a$$

At step S18, the valve current value is measured by the current sensor 32. This valve current value is set as a valve current value d.

At step S19, a current differential value is calculated by differentiating the valve current value d measured at step S18.

At step S20, the decrease counter n is incremented (n=n+1).

At step S21, a judgment is made as to whether or not the current differential value calculated at step S19 is greater than a predetermined correction value judgment threshold value. If YES, the routine proceeds to step S22. If NO, the routine proceeds to step S23. Here, the correction value judgment threshold value is a value by which an inductance of the coil 21 changes by a stroke (movement) of the plunger 24 then a judgment of generation of a counter electromotive force in the coil 21 becomes possible.

At step S22, the detection flag is set (=1).

At step S23, a judgment is made as to whether or not the detection flag is set and also the current differential value calculated at step S19 is smaller than or equal to zero. If YES, the routine proceeds to step S24. If NO, the routine proceeds to step S25.

At step S24, the stored-valve current correction value is set to the valve current expectation value, also the detection flag is cleared or reset (=0).

At step S25, a judgment is made as to whether or not the Duty ratio is smaller than or equal to the lower value A. If YES, the routine proceeds to step S26. If NO, the routine returns to step S16.

At step S26, the valve current correction value is set to a value obtained by subtracting the correction center value from the stored-valve current correction value, also the Duty ratio is set to zero.

Next, action and influence of the embodiment 1 will be explained.

[Principle of Generation of Current Inflection Point]

Figure 6:
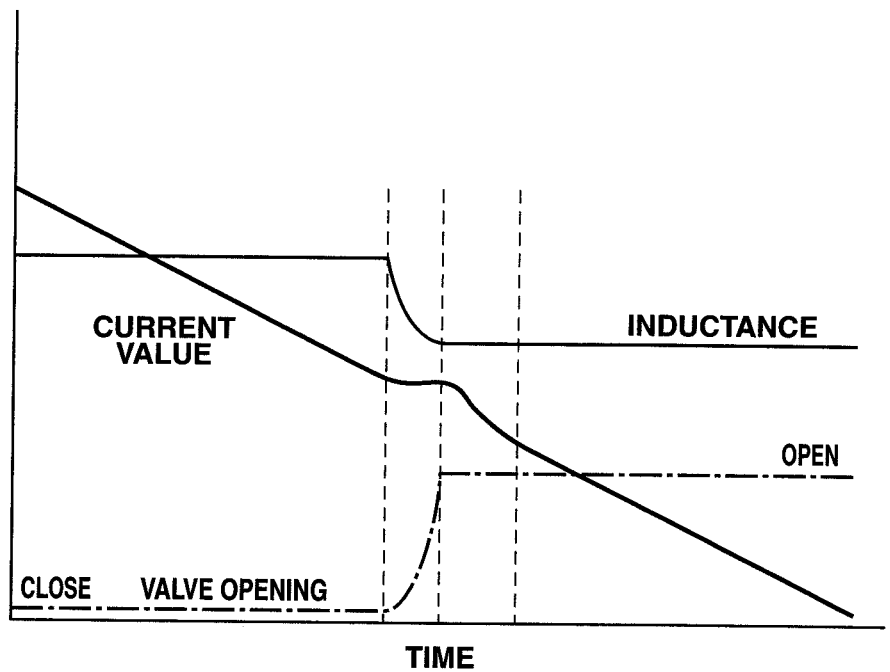
FIG. 6 is a drawing showing a relationship between a current value and an inductance of a coil 21 and valve opening of the proportional electromagnetic valve 20.

FIG. 6 is a drawing showing a relationship between a current value and an inductance of the coil 21 and valve opening of the proportional electromagnetic valve 20.

As shown in FIG. 6, when gradually decreasing the current value supplied to the coil 21 of the proportional electromagnetic valve 20, the valve opening (GAP amount) changes at a point when a relationship in magnitude between an attraction of the coil 21 and the spring force of the coil spring 25 changes from "attraction>spring force" to "attraction<spring force". At this time, since the armature 22 moves by the spring force, the inductance of the coil 21 decreases, and the counter electromotive force is generated in the coil 21 in proportion to a stroke speed of the armature 22. Although this counter electromotive force is generated until the plunger 24 stops, when a stroke amount of the plunger 24 reaches a maximum, namely that when the proportional electromagnetic valve 20 is in the fully open state, the stroke speed is a maximum, and the current passing through the coil 21 has an inflection point (a peak point) (the inflection point (the peak point) appears in the current passing through the coil 21).

Thus, by checking a timing of the generation of the inflection point of the current passing through the coil 21 when the plunger 24 of the proportional electromagnetic valve 20 moves from a valve closed position (a fully closed position) to a valve open position (a fully open position), a timing of actual opening (actual full opening) of the proportional electromagnetic valve 20 can be found. Then by comparing the current value supplied to the coil 21 from the power supply 33 at this time with the design value (the correction center value) at the time point of the valve opening (the full valve opening), it is possible to find or obtain the offset variation of the proportional electromagnetic valve 20.

[Valve Current Value Correction Action]

In the valve current correction value operation process of the embodiment 1, at steps S16 to S25, a series of processes that calculates the differential value (the current differential value) of the valve current value d while decreasing the Duty ratio from the upper value B by ΔDuty is repeated until the Duty ration reaches the lower value A. At this time, when the current differential value exceeds the correction value judgment threshold value at step S21, it is judged that the plunger 24 starts moving (the stroke of the plunger 24 starts) and the counter electromotive force starts to be generated in the coil 21, then the detection flag is set at step S22. After the detection flag is set, when the current differential value becomes zero at step S23 and the inflection point of the current passing through the coil 21 appears, it is judged that the plunger 24 moves up to the valve open position, then the stored-valve current correction value is set to the valve current expectation value c at that time at step S24. Further, at step S26, by subtracting the correction center value from the stored-valve current correction value, the valve current correction value is calculated.

Here, in a case where no gain variation occurs in the proportional electromagnetic valve 20, since the valve current expectation value c is equal to the current value supplied to the coil 21 from the power supply 33, the valve current expectation value c at the point when the inflection point appears in the current of the coil 21 indicates the current value supplied to the coil 21 from the power supply 33 at the point when the proportional electromagnetic valve 20 opens. Therefore, by setting the valve current expectation value c at the point when the inflection point appears in the current of the coil 21 as the stored-valve current correction value and getting the difference from the correction center value (subtracting the correction center value from the stored-valve current correction value), it is possible to determine how much the current value at the point when the plunger 24 of the proportional electromagnetic valve 20 opens shifts from the design value, namely that it is possible to obtain the offset variation of the proportional electromagnetic valve 20.

Figure 7:
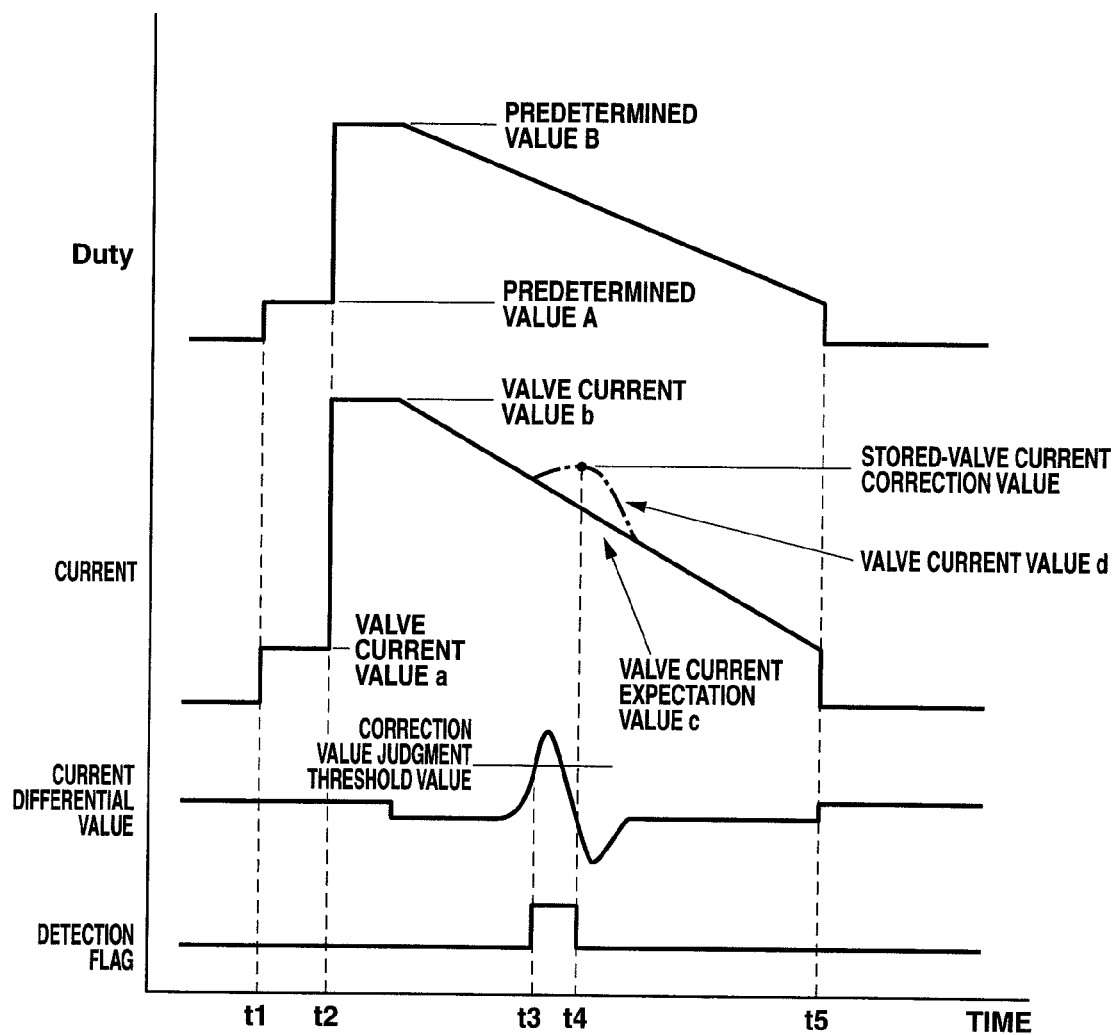
FIG. 7 is a time chart showing action of valve current value correction of the embodiment 1.

FIG. 7 is a time chart showing action of the valve current value correction of the embodiment 1.

At a time point t1, the Duty ratio is set to the lower value A, and the valve current value a is measured.

At a time point t2, the Duty ratio is set to the upper value B, and the valve current value b is measured.

At a time point t3, since the current differential value exceeds the correction value judgment threshold value, the detection flag is set.

At a time point t4, since the current differential value becomes zero, the valve current expectation value c at this time is set as the stored-valve current correction value, and the detection flag is reset.

At a time point t5, since the Duty ratio becomes the lower value A, the valve current correction value is calculated by subtracting the correction center value from the stored-valve current correction value set at time point t4, and the valve is returned to an initial state with the Duty being zero.

The calculated valve current correction value is added to the valve current target value base value at step S9 of the valve current target value operation process shown in FIG. 4, thereby determining the valve current target value that reduces the offset variation of the proportional electromagnetic valve 20. That is, through the valve current correction value operation process of the embodiment 1, the variation of controlled hydraulic pressure with the current of the proportional electromagnetic valve 20 can be reduced without using the pressure sensor.

On the other hand, the related art hydraulic pressure control apparatus requires the pressure sensor. Thus this not only leads to an increase in cost, but also to an increase in size of the unit.

In contrast, since the embodiment 1 does not require the pressure sensor, decrease in cost and reduction in size of the hydraulic unit HU can be realized.

Here, the valve current correction value obtained through the valve current correction value operation process of the embodiment 1 includes not only the offset variation of the proportional electromagnetic valve 20 caused by a variation of the coil spring 25, a variation of a gap between the armature 22 and the valve body 23 and a variation of magnetic force of the coil 21, but also the offset variation caused by a variation of the current sensor 32 and a readout variation of the A/D conversion of the CPU 30 in the drive circuit shown in FIG. 3. Accordingly, by performing the valve current correction value operation process of the embodiment 1 and the valve current target value operation process based on this valve current correction value operation process, the offset variation caused by each individual drive circuit can be reduced.

Further, in the embodiment 1, by generating each valve current target value that reduces the offset variation for each proportional electromagnetic valve 20, a response variation between both line pipes (P line pipe and S line pipe) of the hydraulic unit HU, i.e. a response variation between the gate-out valves 3P and 3S and a response variation between the solenoid-in valves 4FL, 4RR, 4FR and 4RL, can be reduced.

Figure 8A:
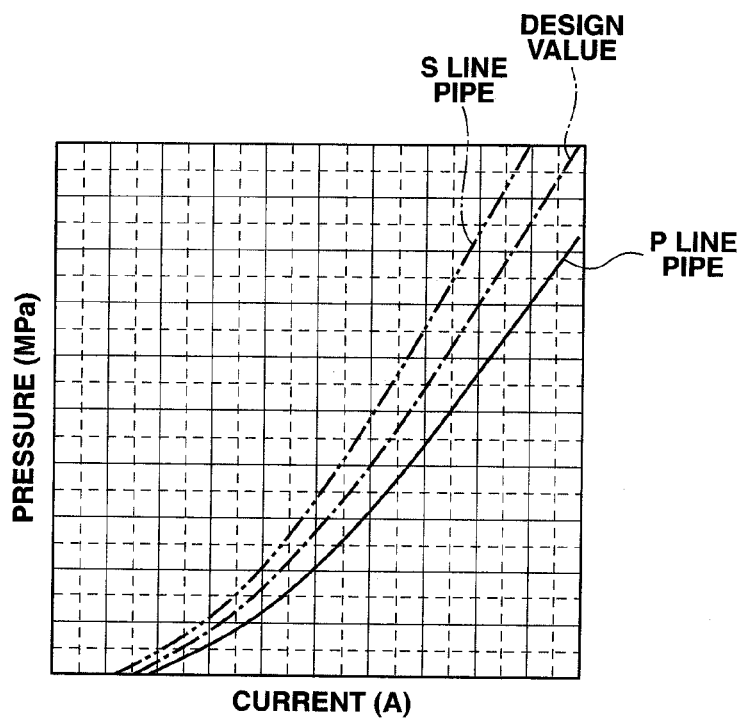
FIGS. 8A and 8B are characteristics of controlled hydraulic pressure with respect to current of gate-out valves 3P, 3S, which show influence of the valve current value correction of the embodiment 1.
Figure 8B:
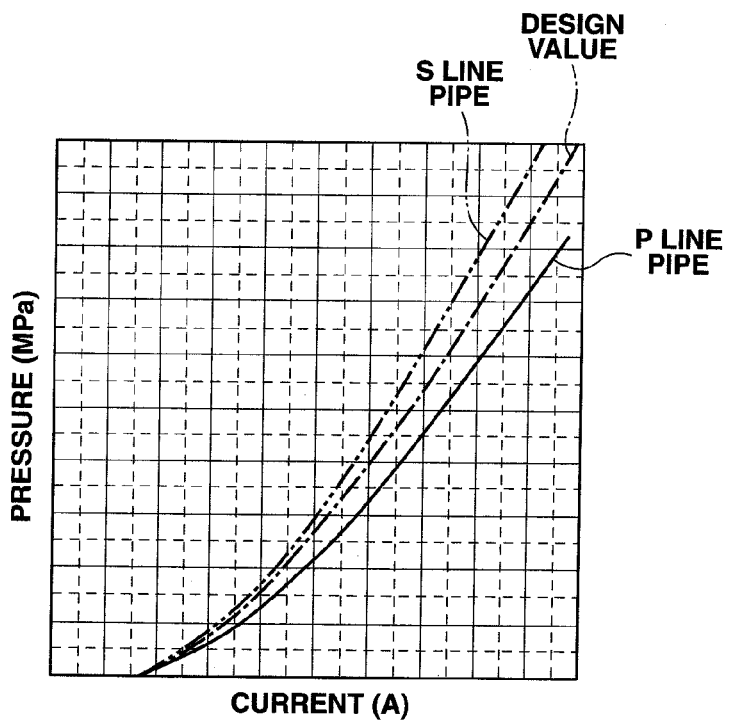

FIGS. 8A and 8B are characteristics of controlled hydraulic pressure with respect to current of the gate-out valves 3P, 3S, which show influence of the valve current value correction of the embodiment 1. FIG. 8A is a case where the valve current target value base value is not corrected. FIG. 8B is a case where the control of the embodiment 1 is applied.

In the case of FIG. 8A where the valve current target value base value is not corrected, because the offset variation between the gate-out valves 3P and 3S is large, a difference in control response between the P line pipe and the S line pipe is large, and this might cause a brake control delay and overshoot.

In contrast to this, in the case of FIG. 8B where the control of the embodiment 1 is applied, since the offset variation between the gate-out valves 3P and 3S can be brought closer to zero, both control responses of the P line pipe and the S line pipe are almost the same, thereby improving accuracy of the brake control.

In the embodiment 1, since the valve current target value base value is corrected so as to eliminate the offset variation of the proportional electromagnetic valve 20, as is clear from the comparison between FIGS. 8A and 8B, the gain variation of the proportional electromagnetic valve 20 in a low control hydraulic pressure area (a low pressure area) can be reduced.

Eliminating the gain variation in the low pressure area in This manner is extremely favorable for increase in controllability of the adaptive cruise control (ACC), because, in general, the adaptive cruise control (ACC) is executed with the aim of keeping a relative relationship (a following distance, a relative speed, etc.) between the vehicle and an ahead-driving vehicle and a high control accuracy is required at a gentle braking.

Thus, reduction in the gain variation in the low pressure area allows increase in the controllability of the adaptive cruise control (ACC).

Here, in a case where the gain variation occurs in the proportional electromagnetic valve 20, as the control hydraulic pressure becomes higher, quantity of variation with the design value becomes larger. However, since a scene in which abrupt or sudden deceleration is needed is rare in the adaptive cruise control (ACC) and this control rarely uses the control hydraulic pressure in a high control hydraulic pressure area (a high pressure area), the controllability is not affected.

In the valve current target value operation process of the embodiment 1, the valve current correction value is calculated when the vehicle is in the stop state and the brake pedal BP is not depressed, and the valve current target value is corrected on the basis of the calculated valve current correction value. That is, by correcting the valve current target value in a no-load state (a state in which pressure by the brake fluid does not act on the proportional electromagnetic valve 20), the offset variation of the proportional electromagnetic valve 20 caused by factors, which affect the stroke speed, such as the spring force of the coil spring 25, the gap between the armature 22 and the valve body 23 and the magnetic force of the coil 21 can be detected more accurately without being affected by the brake fluid.

Further, the correction of the valve current target value is performed only once after the ignition ON. The valve current correction value is the value to absorb or cancel the variation of the controlled hydraulic pressure with the current of the proportional electromagnetic valve 20 due to secular change or an initial individual difference, and the nature of these secular change or individual difference is the one that does not change in a short time during the running. Thus the correction is required only once before the running (a one-time correction before the running is enough).

In addition, the correction of the valve current target value is performed when the brake fluid temperature is higher than the predetermined value. In a case where the brake fluid temperature is low, the brake fluid viscosity is high and the operation error of the valve current correction value becomes large. Thus, in this case, by forbidding the valve current correction value operation at the low temperature, deterioration in a correction accuracy can be suppressed.

Moreover, also when the test signal is inputted from the external test device in the factory, a dealer, etc., the valve current correction value is calculated and the valve current target value is corrected. As a consequence, it is possible to previously reduce the variation of the proportional electromagnetic valve 20 caused by the initial individual difference at the shipment of the vehicle and at the shipment of the hydraulic unit HU. In this case, since the vehicle is not in the running state and environment of the brake fluid temperature etc. is in a controlled condition, the judgments of steps S1 to S5 are not required.

Here, at the shipment of the hydraulic unit HU, the hydraulic unit HU is in a dry state in which the hydraulic circuit is not filled with the brake fluid. However, since the manner of the embodiment 1 does not require the pressure sensor, the variation of the proportional electromagnetic valve 20 can be reduced in a state before installing the hydraulic unit HU in the vehicle without filling the hydraulic circuit with the brake fluid (i.e. without requiring a wet state).

As explained above, in the hydraulic pressure control apparatus of the embodiment 1, the following effects are obtained.

(1) The hydraulic pressure control apparatus has the proportional electromagnetic valve 20 which has the plunger 24 forced to one side by the coil spring 25 and the coil 21 driving the plunger 24 to the other side and is driven on the basis of the calculated valve current target value; the control unit CU which calculates the valve current target value to drive the proportional electromagnetic valve 20 and controls the hydraulic pressure in the hydraulic circuit in the hydraulic unit HU by opening/closing the proportional electromagnetic valve 20; the current sensor 32 which detects the value of the current passing through the coil 21; and the valve current target value correction section 19 which detects the change of the inductance of the coil 21 when the plunger 24 moves from the one side to the other side or from the other side to the one side through the current sensor 32 and corrects the valve current target value using the detected inductance change.

The valve current target value correction section 19 corrects the valve current target value when the rate of change of the current value becomes the predetermined value or greater.

Further, the valve current target value correction section 19 corrects the valve current target value on the basis of the current value when the rate of change of the current value becomes the predetermined value or greater and the current value supplied to the coil 21 from the power supply 33.

Since the counter electromotive force is generated in the coil 21 in proportion to the stroke speed upon the stroke of the plunger 24, by checking the change of the current value of the coil 21, when its rate of change exceeds a rate of change of the current value supplied of the coil 21 from the power supply 33, the stroke of the plunger 24 can be found (it is judged that the plunger 24 is moving). Thus by checking the current value supplied of the coil 21 from the power supply 33 when the rate of change is the predetermined value or greater, it is possible to detect the current value supplied of the coil 21 from the power supply 33 when the proportional electromagnetic valve 20 opens or closes. Therefore by correcting the valve current target value on the basis of this current value, the variation of controlled hydraulic pressure with the current of the proportional electromagnetic valve 20 can be reduced without using the pressure sensor, and decrease in cost and reduction in size of the hydraulic unit HU can be realized.

(2) The valve current target value correction section 19 calculates the differential value of the current value when the plunger 24 moves from the valve closed position to the valve open position, and detects the inflection point of the current change from the differential value, then corrects the valve current target value on the basis of the difference between the valve current expectation value c and the correction center value when the inflection point appears.

When the proportional electromagnetic valve 20 is brought in the fully open state, the stroke speed of the plunger 24 upon the opening of the proportional electromagnetic valve 20 is a maximum, and at this time the inflection point appears in the current passing through the coil 21. Thus by checking the current value supplied of the coil 21 from the power supply 33 when the inflection point appears, it is possible to detect the current value supplied of the coil 21 from the power supply 33 when the proportional electromagnetic valve 20 fully opens. Therefore by correcting the valve current target value on the basis of this current value, the variation of controlled hydraulic pressure with the current of the proportional electromagnetic valve 20 can be reduced without using the pressure sensor, and decrease in cost and reduction in size of the hydraulic unit HU can be realized.

[Embodiment 2]

In a hydraulic pressure control apparatus of an embodiment 2, only the valve current correction value operation process is different from that of the embodiment 1. Since the other element or configuration is the same as the embodiment 1, its explanation is omitted here.

[Valve Current Correction Value Operation Process]

Figure 9:
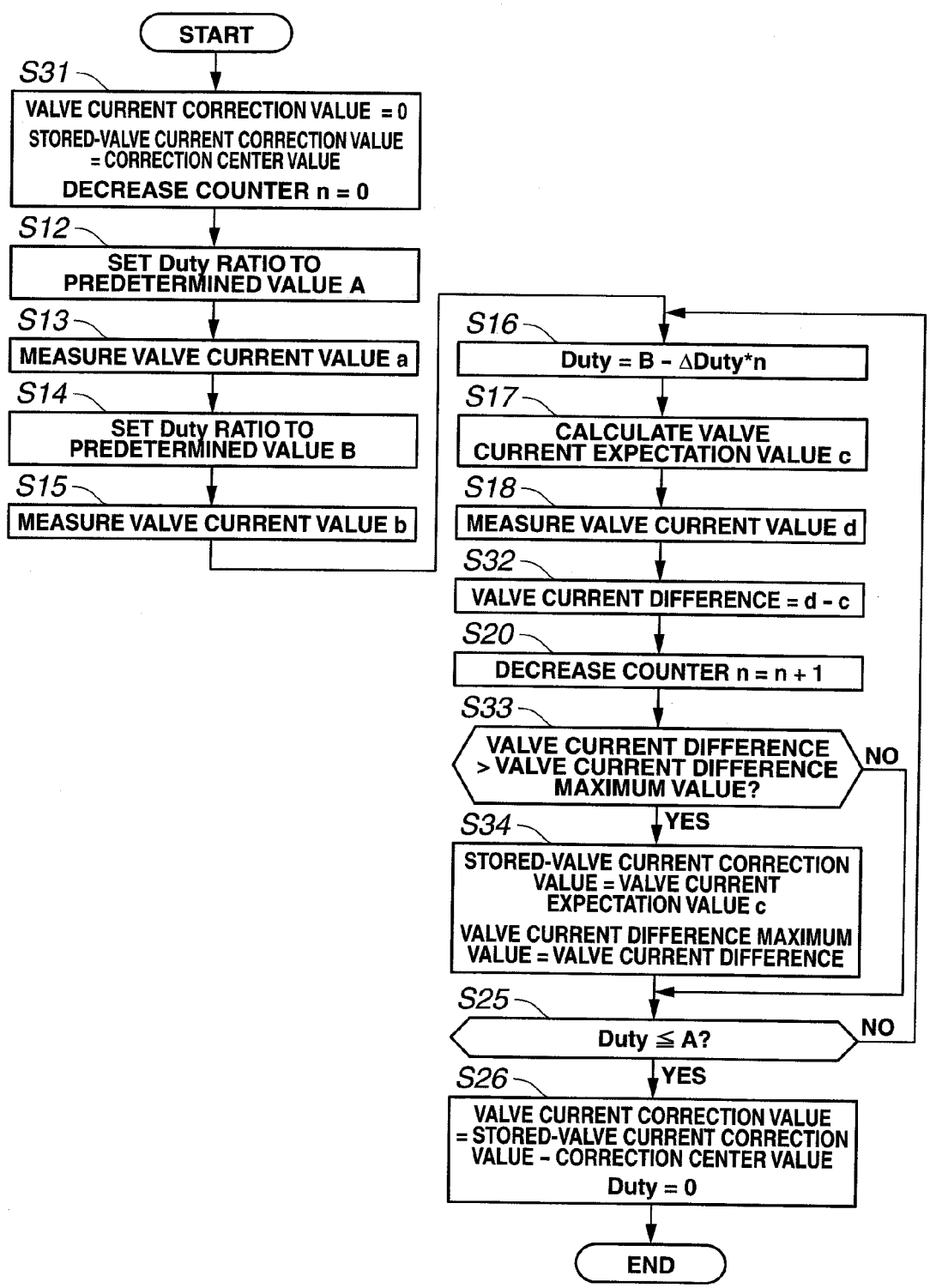
FIG. 9 is a flow chart showing a flow of a valve current correction value operation process of an embodiment 2, executed in step S7 of FIG. 4.

FIG. 9 is a flow chart showing a flow of the valve current correction value operation process of the embodiment 2, executed in step S7 of FIG. 4.

At step S31, the valve current correction value is set to zero, the stored-valve current correction value is set to the predetermined correction center value, and the decrease counter n is cleared or reset (=0).

At step S32, a valve current difference (or a valve current deviation) is calculated by subtracting the valve current expectation value c calculated at step S17 from the valve current value d measured at step S18.

At step S33, a judgment is made as to whether or not the valve current difference (d−c) calculated at step S32 is greater than a valve current difference maximum value (a valve current deviation maximum value). If YES, the routine proceeds to step S34. If NO, the routine proceeds to step S25.

At step S34, the stored-valve current correction value is set to the valve current expectation value c, also the valve current difference maximum value is set as the valve current difference calculated at step S32.

Next, action and influence of the embodiment 2 will be explained.

[Valve Current Value Correction Action]

In the valve current correction value operation process of the embodiment 2, at steps S16 to S25, a series of processes that calculates the valve current difference (d−c) that is the difference between the valve current value d and the valve current expectation value c while decreasing the Duty ratio from the upper value B by ΔDuty is repeated until the Duty ration reaches the lower value A. At this time, when the valve current difference exceeds the valve current difference maximum value that is a maximum value of the last valve current difference at step S33, both of the stored-valve current correction value and the valve current difference maximum value are updated at step S34.

Thus, the stored-valve current correction value when the Duty ratio reaches the lower value A at step S25 and the routine proceeds to step S26 is the valve current expectation value c when the valve current difference becomes a maximum, i.e. when the plunger 24 moves up to the valve open position (the fully open position). Therefore by subtracting the correction center value from the stored-valve current correction value at step S26, the valve current correction value is calculated.

Figure 10:
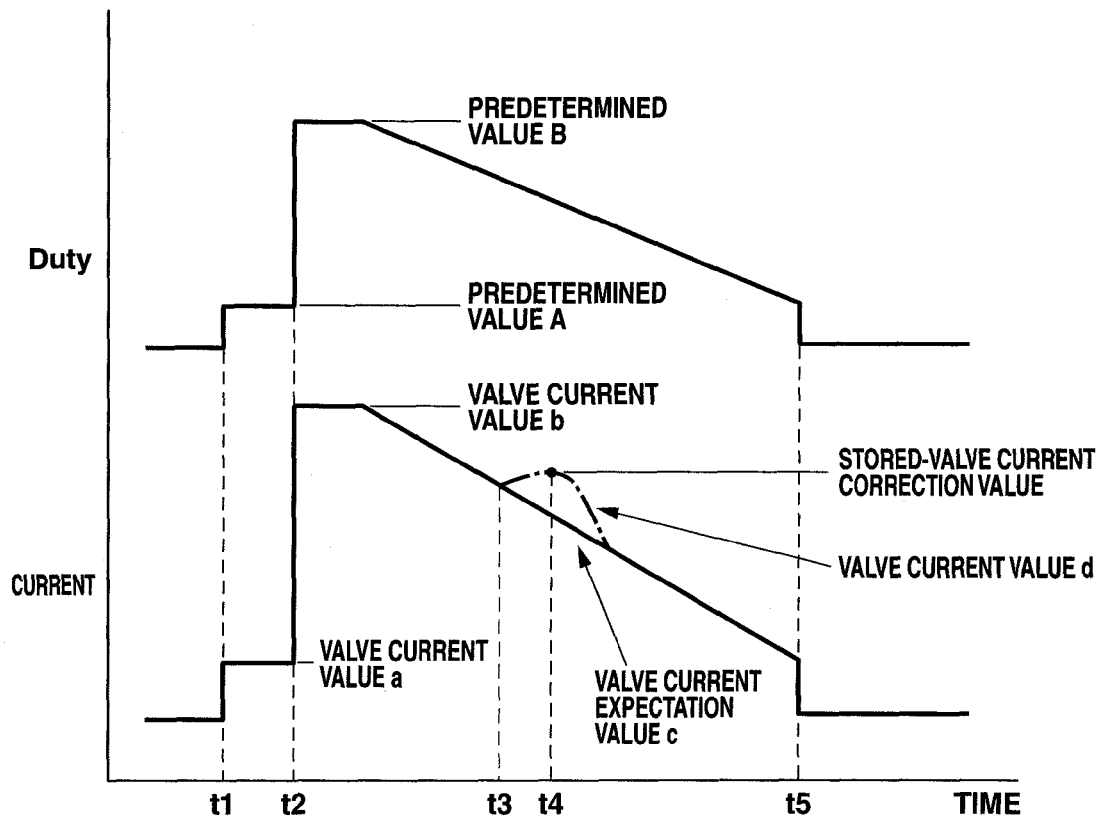
FIG. 10 is a time chart showing action of valve current value correction of the embodiment 2.

FIG. 10 is a time chart showing action of the valve current value correction of the embodiment 2.

At a time point t1, the Duty ratio is set to the lower value A, and the valve current value a is measured.

At a time point t2, the Duty ratio is set to the upper value B, and the valve current value b is measured.

At a time point t3, the valve current value d and the valve current expectation value c start to separate from each other, and the stored-valve current correction value and the valve current difference maximum value continue being updated until a time point t4.

At the time point t4, the valve current difference (d−c) becomes the maximum. After the time point t4, since the valve current difference (d−c) decreases or becomes smaller, the stored-valve current correction value is not updated.

At a time point t5, since the Duty ratio becomes the lower value A, the valve current correction value is calculated by subtracting the correction center value from the stored-valve current correction value set at the time point t4, and the valve is returned to an initial state with the Duty being zero.

The calculated valve current correction value is added to the valve current target value base value at step S9 of the valve current target value operation process shown in FIG. 4, thereby determining the valve current target value that can reduce the offset variation of the proportional electromagnetic valve 20. That is, through the valve current correction value operation process of the embodiment 2, as same as the embodiment 1, the variation of controlled hydraulic pressure with the current of the proportional electromagnetic valve 20 can be reduced without using the pressure sensor.

In the hydraulic pressure control apparatus of the embodiment 2, in addition of the effects of the embodiment 1, the following effects are obtained.

(3) The hydraulic pressure control apparatus has the proportional electromagnetic valve 20 which has the proportional electromagnetic valve 20 which has the plunger 24 forced to one side by the coil spring 25 and the coil 21 driving the plunger 24 to the other side and is driven on the basis of the calculated valve current target value; the control unit CU which calculates the valve current target value to drive the proportional electromagnetic valve 20 and controls the hydraulic pressure in the hydraulic circuit in the hydraulic unit HU by opening/closing the proportional electromagnetic valve 20; the current sensor 32 which detects the valve current value d; and the valve current target value correction section 19 which checks the valve current value d when the plunger 24 moves from the valve closed position to the valve open position and corrects the valve current target value on the basis of the difference between the valve current expectation value c and the correction center value when the valve current difference (d−c) becomes the maximum.

When the proportional electromagnetic valve 20 is brought in the fully open state, the stroke speed of the plunger 24 upon the opening of the proportional electromagnetic valve 20 is a maximum, and the counter electromotive force generated in the coil 21 becomes a maximum. At this time, the valve current difference (d−c) also becomes the maximum. Thus by checking the current value supplied of the coil 21 from the power supply 33 at this time, it is possible to detect the current value supplied of the coil 21 from the power supply 33 when the proportional electromagnetic valve 20 fully opens. Therefore by correcting the valve current target value on the basis of this current value, the variation of controlled hydraulic pressure with the current of the proportional electromagnetic valve 20 can be reduced without using the pressure sensor, and decrease in cost and reduction in size of the hydraulic unit HU can be realized.

[Embodiment 3]

An embodiment 3 is the one that reduces the offset variation of the normally-closed proportional electromagnetic valve. The normally-closed proportional electromagnetic valve can be used for the gate-in valve 2 and the solenoid-out valve 5 shown in FIG. 1.

[Normally-Closed Proportional Electromagnetic Valve]

Figure 11:
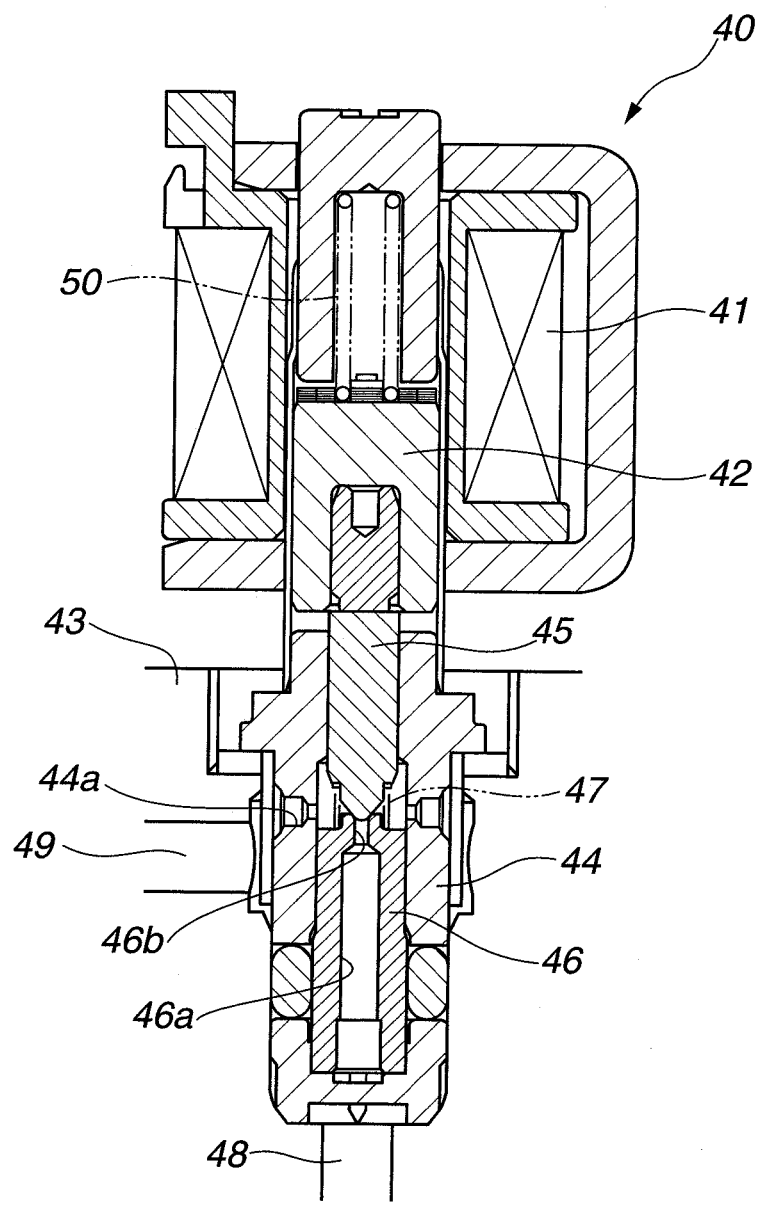
FIG. 11 is a longitudinal cross section of a normally-closed proportional electromagnetic valve 40 of an embodiment 3.

FIG. 11 is a longitudinal cross section of a normally-closed proportional electromagnetic valve 40 of the embodiment 3.

The proportional electromagnetic valve 40 has a coil 41 that generates an electromagnetic force by being supplied with current and an armature 42 that acts by the electromagnetic force. A valve body 44 press-fitted into a housing 43 is provided with an axial direction penetration hole. A plunger (a valve body) 45 that moves integrally with the armature 42 upon the valve closure, a coil spring 47 that forces the plunger 45 in a valve-opening direction and a seat valve 46 are provided in the axial direction penetration hole.

The seat valve 46 has an axial center oil passage 46a and an orifice 46b. The axial center oil passage 46a connects to an oil passage 48 in the axial center of the seat valve 46. The orifice 46b is provided at an upper end of the seat valve 46 and communicates with a seat surface. A radial direction oil passage 44a that communicates with an oil passage 49 is formed at a side surface of the valve body 44. Further, a coil spring (an elastic member) 50 that forces the armature 42 in a valve-closing direction is provided at un upper end of the armature 42.

When starting the current supply to the coil 41, the electromagnetic force is generated in the coil 41, and the armature 42 is attracted or pulled upward in FIG. 11, then the plunger 45 is pulled up against a spring force (an urging force) of the coil spring 50. With this action, the plunger 45 separates from the seat surface of the seat valve 46 and the orifice 46b is released (opened), then the oil passage 48 and the oil passage 49 communicate with each other.

In a no-current supply state, the plunger 45 is forced downward in FIG. 11 by the coil spring 50, and the orifice 46b is closed then communication between the oil passage 48 and the oil passage 49 is interrupted.

[Principle of Generation of Current Inflection Point]

Figure 12:
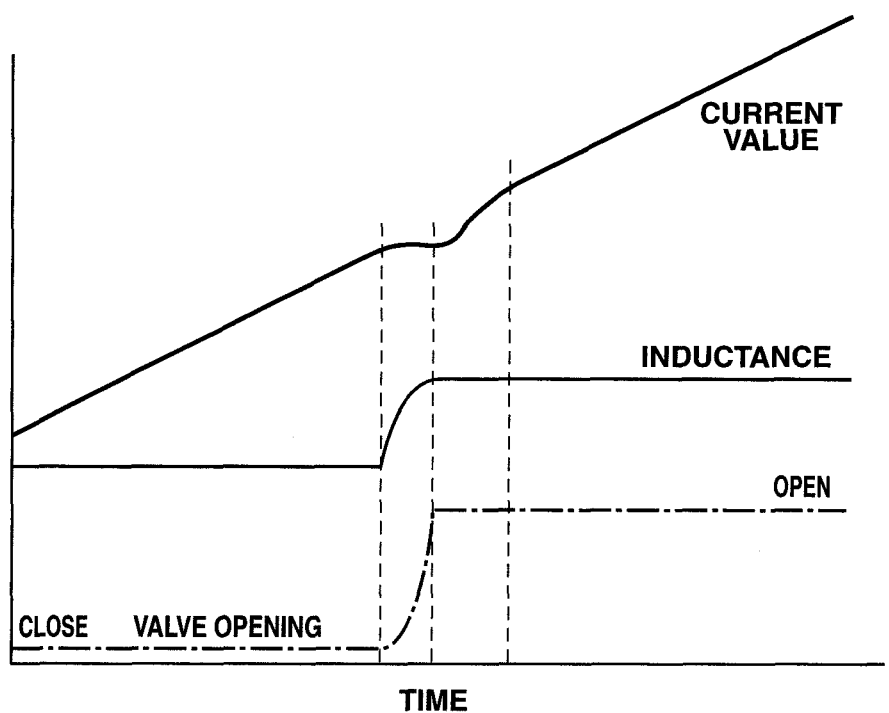
FIG. 12 is a drawing showing a relationship between a current value and an inductance of a coil 41 and valve opening of the proportional electromagnetic valve 40.

FIG. 12 is a drawing showing a relationship between a current value and an inductance of the coil 41 and valve opening of the proportional electromagnetic valve 40.

As shown in FIG. 12, when gradually increasing the current value supplied to the coil 41 of the proportional electromagnetic valve 40, the valve opening (GAP amount) changes at a point when a relationship in magnitude between an attraction of the coil 41 and the spring force of the coil spring 50 changes from "attraction<spring force" to "attraction>spring force". Here, although a spring force of the coil spring 47 acts in the same direction as that of the attraction of the coil 41, since the spring force of the coil spring 47 is much smaller than that of the coil spring 50, the spring force of the coil spring 47 is not taken into consideration here. At this time, since the armature 42 moves by the attraction of the coil 41, the inductance of the coil 41 increases, and the counter electromotive force is generated in the coil 41 in proportion to a stroke speed of the armature 42. Although this counter electromotive force is generated until the plunger 45 stops, since the spring force of the coil spring 50 acts on the armature 42, the stroke speed of the armature 42 gradually decreases. When a stroke amount of the plunger 45 reaches a maximum, namely that when the proportional electromagnetic valve 40 is in the fully open state, the stroke speed is a minimum, and the current passing through the coil 41 has an inflection point (a bottom point) (the inflection point (the bottom point) appears in the current passing through the coil 41).

That is, by checking a timing of the generation of the inflection point of the current passing through the coil 41 when the plunger 45 of the proportional electromagnetic valve 40 moves from a valve closed position (a fully closed position) to a valve open position (a fully open position), a timing of actual opening (actual full opening) of the proportional electromagnetic valve 40 can be found. Then by comparing the current value at this time with the design value (the correction center value) at the time point of the valve opening (the full valve opening), it is possible to find or obtain the offset variation of the proportional electromagnetic valve 40.

Accordingly, also in the embodiment 3, by performing the valve current target value operation process and the valve current correction value operation process shown in the embodiments 1 and 2, the offset variation of the gate-in valve 2 and the solenoid-out valve 5 using the normally-closed proportional electromagnetic valve 40 can be reduced.

[Other Embodiment]

The present invention is not limited to the above embodiments.

For example, in the above embodiments, the valve current target value is corrected by adding the valve current correction value to the valve current target value base value. However, the valve current correction value could be generated by using a map. Further, since there is a difference in the hydraulic unit HU between the dry state (at the shipment) and the wet states (at the installation of the hydraulic unit HU), the valve current correction value could be individually generated. In addition, the map might be changed between the dry and wet states.

In the above embodiments, the timing when the electromagnetic valve opens is detected by checking the change of the current value from the closed state to the open of the plunger. However, the timing when the electromagnetic valve closes can be detected by checking the change of the current value from the open state to the closure of the plunger.

The entire contents of Japanese Patent Application No. 2010-054424 filed on Mar. 11, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hydraulic pressure control apparatus comprising:
   an electromagnetic valve which has:
   (a) a valve body configured with an elastic member, to force the valve body to one side; and
   (b) a coil configured to drive the valve body to the other side, on the basis of a command current value; and
   at least one of a hardware processor and circuitry, configured to effect:
   a hydraulic pressure control section to apply an initial command current value to drive the electromagnetic valve during testing, to control an opening or closing of the electromagnetic valve using the initial command current value;
   a current detection section to detect a value of a current passing through the coil, during a driving of the electromagnetic valve using the initial command current value; and
   a command current value correction section to utilize the current passing through the coil to detect a change of an inductance of the coil when the valve body moves from the one side to the other side or from the other side to the one side through the current detection section for the opening or closing of the electromagnetic valve, and to correct the initial command current value to the command current value using the detected inductance change, to reduce an offset variation of the opening or closing of the electromagnetic valve from a predetermined reference opening or closing of a predetermined reference electromagnetic valve.

2. The hydraulic pressure control apparatus as claimed in claim 1, wherein:
   the command current value correction section is configured to correct the command current value when a rate of change of the value of the current becomes a predetermined value or greater.

3. The hydraulic pressure control apparatus as claimed in claim 2, wherein:
   the command current value correction section is configured to correct the command current value on the basis of: when the rate of change of the value of the current becomes the predetermined value or greater; and a current value of power supply current supplied to the coil from a power supply.

4. The hydraulic pressure control apparatus as claimed in claim 3, wherein:
   the hydraulic pressure control apparatus is used for a hydraulic unit in a brake unit installed in a vehicle, and has a dual line piping system and oil passages formed in each line pipe and connecting a master cylinder and a wheel cylinder, and a separate one of the electromagnetic valve is provided at each oil passage, and the command current value correction section is configured to determine a customized command current value for each said separate one of the electronic valve provided at each oil passage, to reduce an offset variation of an opening or closing between electromagnetic valves.

5. The hydraulic pressure control apparatus as claimed in claim 4, wherein:
   the command current value correction section is configured to effect the correction of the command current value during a time when no hydraulic pressure is generated in the oil passage.

6. The hydraulic pressure control apparatus as claimed in claim 5, wherein:
   after completion of the testing, the electromagnetic valve is driven on the basis of the command current value corrected by the command current value correction section.

7. The hydraulic pressure control apparatus as claimed in claim 4, wherein:
   the vehicle has an ignition switch to start up the vehicle, and the command current value correction section is configured to effect the correction of the command current value only once after each time the ignition switch is turned ON.

8. The hydraulic pressure control apparatus as claimed in claim 1, wherein:
the command current value correction section is configured to judge, by the change of the inductance, that the valve body starts moving from the other side to the one side when an urging force of the elastic member becomes greater than an attraction of the coil after the valve body forced to the one side by the elastic member is driven to the other side by the coil.

9. The hydraulic pressure control apparatus as claimed in claim 1, wherein:
the command current value correction section is configured to calculate a differential value of the value of the current when the valve body moves from a valve closed position to a valve open position, and to detect an inflection point of a current change from the differential value, then to correct the command current value based upon a time when the inflection point appears.

10. The hydraulic pressure control apparatus as claimed in claim 9, wherein:
after completion of the testing, the electromagnetic valve is driven on the basis of the command current value corrected by the command current value correction section.

11. The hydraulic pressure control apparatus as claimed in claim 10, wherein:
the command current value correction section is configured to correct the command current value on the basis of: when the inflection point of the current change appears; and a current value of power supply current supplied to the coil from a power supply.

12. The hydraulic pressure control apparatus as claimed in claim 10, wherein:
the hydraulic pressure control apparatus is used for a hydraulic unit in a brake unit installed in a vehicle, and has a dual line piping system and oil passages formed in each line pipe and connecting a master cylinder and a wheel cylinder, and a separate one of the electromagnetic valve is provided at each oil passage, and the command current value correction section is configured to determine a customized command current value for each said separate one of the electronic valve provided at each oil passage, to reduce an offset variation of an opening or closing between electromagnetic valves.

13. The hydraulic pressure control apparatus as claimed in claim 12, wherein:
the command current value correction section is configured to effect the correction of the command current value during a time when no hydraulic pressure is generated in the oil passage.

14. The hydraulic pressure control apparatus as claimed in claim 13, wherein:
the vehicle has an ignition switch to start up the vehicle, and the command current value correction section is configured to effect the correction of the command current value only once after each time the ignition switch is turned ON.

15. A hydraulic pressure control apparatus comprising:
an electromagnetic valve which has:
(a) a valve body configured with an elastic member, to force the valve body to one side; and
(b) a coil configured to drive the valve body to the other side, on a basis of a command current value; and
at least one of a hardware processor and circuitry, configured to effect:
a hydraulic pressure control section to apply an initial command current value to drive the electromagnetic valve during testing, and to control an opening or closing of the electromagnetic valve using the initial command current value;
a current detection section to detect a value of a current passing through the coil, during a driving of the electromagnetic valve using the initial command current value; and
a command current value correction section to check the value of the current when the valve body moves between a valve closed position and a valve open position, and to correct the initial command current value on a basis of a current value of power supply current supplied to the coil from a power supply when a difference between the value of the current and a predetermined threshold value becomes a maximum, where said correct reduces an offset variation of the opening or closing of the electromagnetic valve from a predetermined reference opening or closing of a predetermined reference electromagnetic valve.

16. The hydraulic pressure control apparatus as claimed in claim 15, wherein:
the hydraulic pressure control apparatus is used for a hydraulic unit in a brake unit installed in a vehicle, and has a dual line piping system and oil passages formed in each line pipe and connecting a master cylinder and a wheel cylinder, and a separate one of the electromagnetic valve is provided at each oil passage, and the command current value correction section is configured to determine a customized command current value for each said separate one of the electronic valve provided at each oil passage, to reduce an offset variation of an opening or closing between electromagnetic valves.

17. The hydraulic pressure control apparatus as claimed in claim 16, wherein:
the command current value correction section is configured to effect the correction of the command current value during a time when no hydraulic pressure is generated in the oil passage.

18. The hydraulic pressure control apparatus as claimed in claim 15, wherein:
after completion of the testing, the electromagnetic valve is driven on the basis of the command current value corrected by the command current value correction section.

19. A hydraulic pressure control apparatus used for a hydraulic unit in a brake unit installed in a vehicle, comprising:
a dual line piping system;
oil passages which are formed in each line pipe of the dual line piping system, and which connect a master cylinder and a wheel cylinder;
an electromagnetic valve, for each oil passage of the oil passages, which is arranged in the oil passage and which includes:
(a) a valve body configured with an elastic member, to force the valve body to one side; and
b) a coil configured to drive the valve body to the other side, on a basis of a command current value; and
at least one of a hardware processor and circuitry, configured to effect:
a hydraulic pressure control section to apply an initial command current value to drive the electromagnetic valve during testing, and to control an opening or closing of the electromagnetic valve using the initial command current value;

a current detection section to detect a value of a current passing through the coil, during a driving of the electromagnetic valve using the initial command current value; and a command current value correction section to utilize the current passing through the coil to detect, in a state in which no hydraulic pressure is generated in the oil passage, a change of an inductance of the coil when the valve body moves from the one side to the other side or from the other side to the one side by either detecting a rate of change of the current of the coil or detecting an inflection point of a change of the current using the current detection section, and to correct the initial command current value to obtain the command current value using the detected change of the inductance, to reduce an offset variation of the opening or closing of the electromagnetic valve from a predetermined reference opening or closing of a predetermined reference electromagnetic valve, wherein the command current value correction section is configured to drive the electromagnetic valve, after the testing, on the basis of the command current value.

20. The hydraulic pressure control apparatus as claimed in claim 19, wherein:

the command current value correction section is configured to effect the correction of the command current value during a time when no hydraulic pressure is generated in the oil passage.

\* \* \* \* \*